(12) United States Patent
Clafton

(10) Patent No.: US 10,864,617 B2
(45) Date of Patent: Dec. 15, 2020

(54) ANTI-ROLL SOCKET WRENCH SLEEVE AND SOCKET SIZE INDICATOR

(71) Applicant: James Clafton, West Jordan, UT (US)

(72) Inventor: James Clafton, West Jordan, UT (US)

( * ) Notice: Subject to any disclaimer, the term of this patent is extended or adjusted under 35 U.S.C. 154(b) by 173 days.

(21) Appl. No.: 16/032,046

(22) Filed: Jul. 10, 2018

(65) Prior Publication Data

US 2020/0016728 A1 Jan. 16, 2020

(51) Int. Cl.
*B25B 13/48* (2006.01)
*B25B 13/06* (2006.01)
*G09F 3/02* (2006.01)

(52) U.S. Cl.
CPC .............. *B25B 13/48* (2013.01); *B25B 13/06* (2013.01); *B23B 2231/0248* (2013.01); *G09F 3/02* (2013.01)

(58) Field of Classification Search
CPC . B25B 13/48; B25B 13/06; G09F 2003/0251; G09F 7/16
See application file for complete search history.

(56) References Cited

U.S. PATENT DOCUMENTS

| | | | | |
|---|---|---|---|---|
| 4,800,786 A * | 1/1989 | Arnold | B25B 13/06 81/121.1 |
| 4,825,732 A * | 5/1989 | Arnold | B25B 13/06 81/121.1 |
| 4,836,059 A * | 6/1989 | Arnold | B25B 13/06 76/114 |
| 4,947,713 A * | 8/1990 | Arnold | B25B 13/06 81/121.1 |
| 5,018,232 A * | 5/1991 | Sachetti | A47C 27/002 5/482 |
| 5,819,606 A * | 10/1998 | Arnold | B25B 13/06 81/124.3 |
| 5,957,012 A * | 9/1999 | McCune | B25B 13/56 81/180.1 |
| 6,761,093 B2 * | 7/2004 | Chang | B25B 13/06 81/121.1 |
| D581,755 S * | 12/2008 | Hu | D8/29 |
| D585,255 S * | 1/2009 | Hu | D8/29 |
| 7,627,968 B2 * | 12/2009 | Lin | B25B 13/06 40/306 |
| D632,149 S * | 2/2011 | Li | D8/29 |
| 7,987,748 B2 * | 8/2011 | Chiu | B25B 13/06 81/121.1 |
| 8,074,539 B2 * | 12/2011 | Lin | B25B 13/06 81/121.1 |
| 8,359,953 B2 * | 1/2013 | Lin | B25B 15/002 81/121.1 |
| 8,658,066 B2 * | 2/2014 | Bindra | C09K 11/02 252/700 |
| 2003/0140738 A1 * | 7/2003 | Wallace | B25B 13/06 81/121.1 |
| 2012/0031242 A1 * | 2/2012 | Li | B25B 13/06 81/121.1 |
| 2016/0140880 A1 * | 5/2016 | Su | G09F 3/02 40/661.05 |
| 2016/0271760 A1 * | 9/2016 | Hu | B25B 13/56 |

* cited by examiner

*Primary Examiner* — Michael McCullough
(74) *Attorney, Agent, or Firm* — Steven Rinehart

(57) ABSTRACT

A socket wrench sleeve adapted to insulate fingers from heat, indicate a socket wrench size, and prevent rolling is provided having either a plurality of planar faces or section breaks, and imprinted or having relief text indicating a socket wrench size and ratchet square driver size.

11 Claims, 4 Drawing Sheets

ANTI-ROLL SOCKET WRENCH SLEEVE AND SOCKET SIZE INDICATOR

FIELD OF THE INVENTION

This invention relates to handheld tools and implements, and more particularly relates to ratchets and socket wrenches.

BACKGROUND

Description of the Related Art

The following background information may present examples of specific aspects of the prior art (e.g., without limitation, approaches, facts, or common wisdom) that, while expected to be helpful to further educate the reader as to additional aspects of the prior art, is not to be construed as limiting the present invention, or any embodiments thereof, to anything stated or implied therein or inferred thereupon.

Socket wrenches (i.e., sockets) are well known in the art and are most commonly hexagonal. Sockets are typically driven by a detachable ratchet or pneumatic driving tool, usually a handheld ratchet with a male square fitting for detachably engaging the socket. The socket wrench has a standardized (ANSI B107, ISO, or other consensus standard) square recess to accept the socket wrench's drive size. Male drivers are also produced for use with socket head cap screws, and are often called square drivers.

Sockets are almost universally cylindrical and formed from stainless steel, coming in a myriad of standard sizes, including standard sizes under the metric system and fractional inch systems. A complete socket set consists of dozens of sizes of sockets, many of which are indistinguishable from one another based on appearance alone.

As such, it can be very difficult for the correct socket needed for a particular application to be identified by mechanics or lay persons. Although manufacturers take great care in many situations to retail sockets with hard cases having slots or other means for storing individual sockets and identifying them, in practice sockets are usually strewn in drawers or tool boxes. Man hours are wasted with every job manually trying the sockets one-by-one on a particular screw to see if the socket is the right size. There are no effective means in the art of identifying socket sizes before use.

The situation is further complicated by the fact that sockets are always round. As such, the sockets roll off planar surfaces such as work benches and are lost. Additionally, the stainless steel sockets often become too hot to touch from friction during use or from contact with fuel combustion engines, sunlit surfaces, or the like.

There is no solution in the art to these inefficiencies. Accordingly, there exists a need in the art for a position indicator which solves these inefficiencies in the art. It is an object of the present invention to provide such a solution.

SUMMARY

From the foregoing discussion, it should be apparent that a need exists for a anti-roll socket wrench sleeve and socket size indicator. Beneficially, such an apparatus would provide means of curing the deficiencies in the prior art described above, including preventing rolling, burning temperatures, and facilitate easy identification of size.

The present invention has been developed in response to the present state of the art, and in particular, in response to the problems and needs in the art that have not yet been fully solved by currently available apparati. Accordingly, the present invention has been developed to provide a detachable, anti-roll, socket wrench size indicator which insulates a user's finger from heat comprising: a silicone sleeve defining a hollow cylindrical inner recess for receiving and partially enveloping a socket wrench, the silicone sleeve having a faceted outer surface; wherein two or more faceted surfaces bear relief text indicating a socket wrench size; wherein two or more surfaces bear relief text indicating ratchet square driver size.

The socket wrench size indicator may further comprise four or more planar outer faces such that the socket wrench size indicator comes to rest on a face without rolling on a substantially planar surface.

The socket wrench size indicator may further comprise a plurality of socket wrench size indicators, with socket wrench size indicators indicating a metric size color coordinated to distinguish from socket wrench size indicators indicating a fractional inch.

In various embodiments, the socket wrench size indicator further comprises one or more blacklight-reflective paints.

The socket wrench size indicator further comprises one or more chemiluminescent paints.

The socket wrench size indicator may further comprise a plurality of sections separated by section breaks.

A detachable, anti-roll, socket wrench size indicator with insulating means is provided comprising: a silicone sleeve defining a hollow cylindrical inner recess for receiving and partially enveloping a socket wrench, the silicone sleeve having a multi-faced outer surface; wherein two or more faceted surfaces are imprinted with text indicating a socket wrench size; wherein two or more surfaces are imprinted with text indicating a ratchet square driver size.

The socket wrench size indicator may further comprise four or more planar outer faces indicating a socket wrench size. The socket wrench size indicator, in some embodiments, further comprises one or more surfaces indicating a trademark.

The socket wrench size indicator may further comprise one or more blacklight-reflective paints. The socket wrench size indicator further comprises one or more chemiluminescent paints.

The socket wrench size indicator, in various embodiments, further comprises a plurality of sections separated by section breaks adapted to engage a user's fingers.

A detachable, insulated, anti-roll, socket wrench size indicator is provided comprising: a silicone sleeve defining a hollow cylindrical inner recess for receiving and partially enveloping a socket wrench, the silicone sleeve having three or more planar faces separated by section breaks indicating a socket wrench size; wherein the socket wrench size indicator is adapted to come to rest without rolling on a substantially planar surface.

The socket wrench size indicator, in various embodiments, further comprises one or more blacklight-reflective paints.

The socket wrench size indicator may further comprise one or more chemiluminescent paints.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

It an object of the present invention to provide a novel detachable, anti-roll, socket wrench sleeve adapted to insulate a user's fingers from heat with size indication means.

Figure 1:
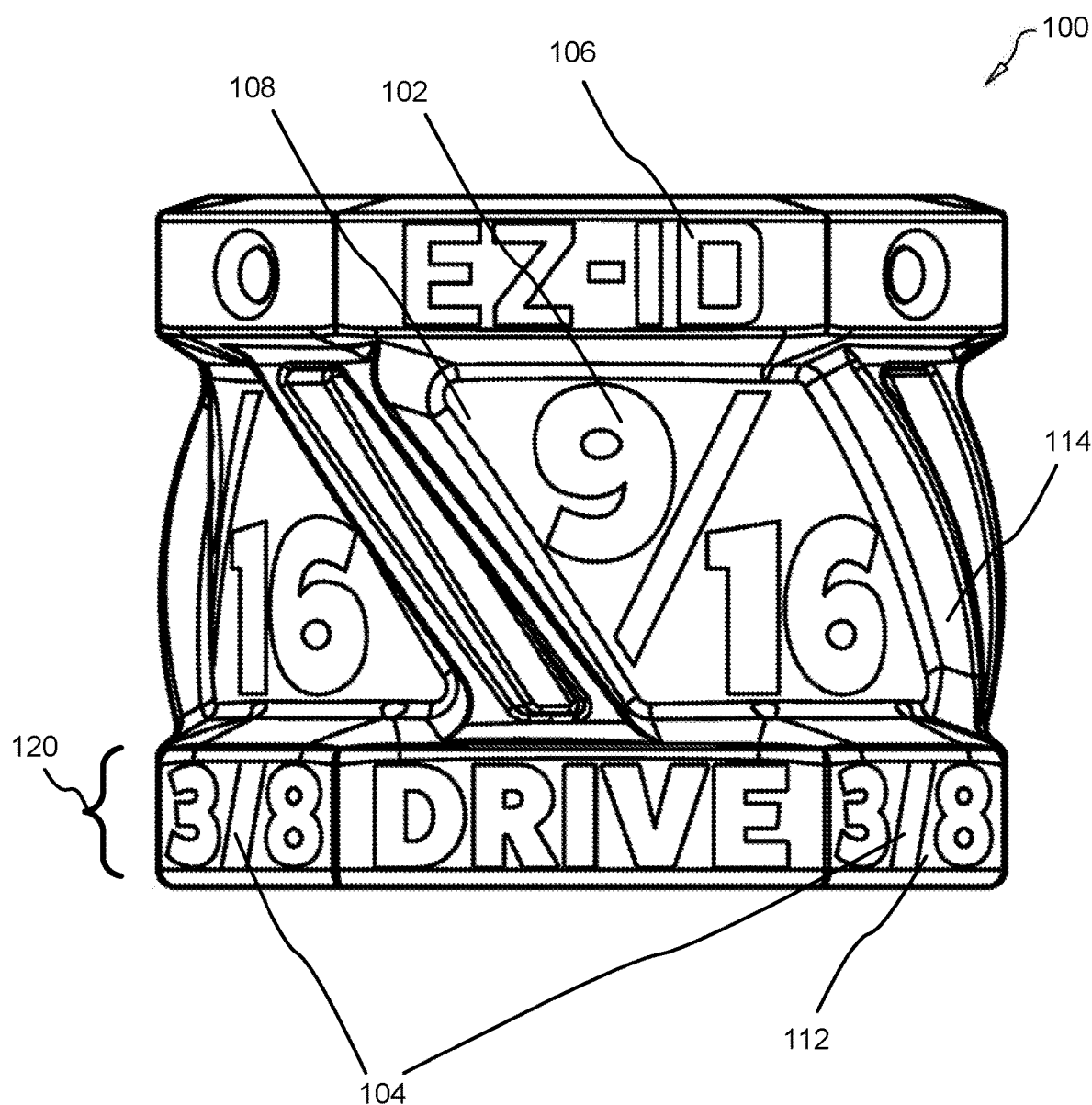
FIG. 1 is a side perspective view of a socket sleeve and size indicator in accordance with the present invention.

FIG. 1 is a side perspective view of a socket sleeve and size indicator 100 in accordance with the present invention.

The size indicator 108 comprises a plurality of sections 108, one or more of which may indicate a socket wrench size. The socket wrench size 102 as shown is 9/16, but may be 3/5, 5/8 or any other metric or fractional inch size known to those of skill in the art.

In various embodiments, a plurality of socket indicators 100 are included in a set, each size indicator 100 in the set sized to fit a different size socket wrench. Two or more sets may be included, including a metric set and fractional inch set, with each set color coordinated to in one or more sections 108 to indicate metric or fractional inch.

The size indicator 100 includes circumscribing bands 120. The bands 120 may comprise separate sections 112 indicating a ratchet square driver size 104.

The section 108 are separated by section breaks 114 as shown adapted to engage a user's fingers. The section breaks 108 may be knurled but do not have to be. These section breaks 108 are designed to provide better grip and thus eliminate the need for a separate finger ratchet.

A trademark is indicated on a top band 120 at 106.

Figure 2:
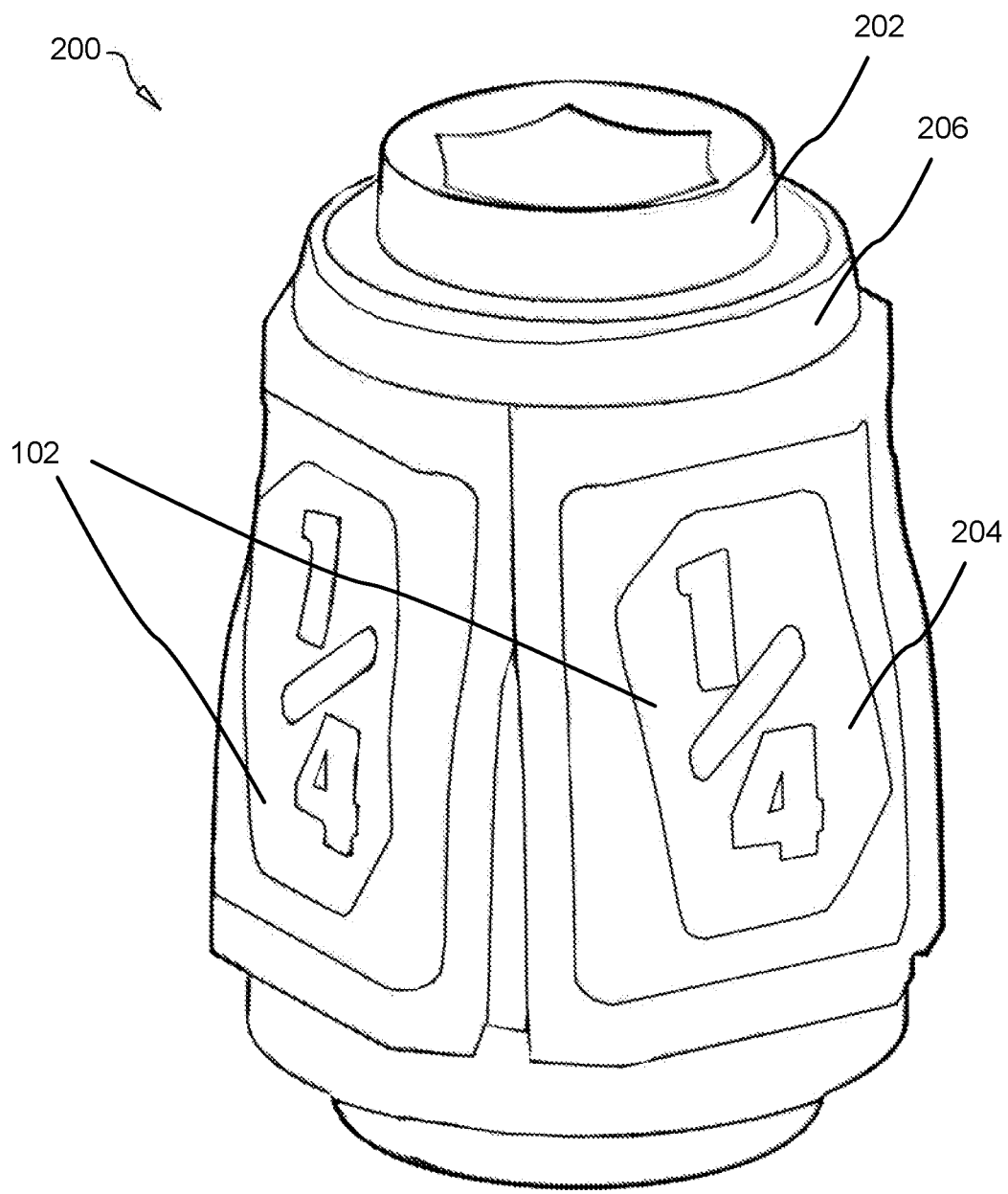
FIG. 2 is a top, side perspective view of a socket sleeve and size indicator in accordance with the present invention.

FIG. 2 is a top, side perspective view of a socket sleeve and size indicator 200 in accordance with the present invention.

The colors of the size indicator 200 may include blacklight reflective colors or florescent or chemiluminescence colors so that the size indicator 200 may be seen in the dark under work benches and in confined area, sometimes with the assistance of a blacklight-emitting flashlight.

A background color 204 of the size indicator 200 may be color coordinated to indicate either a metric unit of measurement or a fractional inch unit of measurement. In various other embodiments, a ring color 206 of a ring circumscribing or partially circumscribing the size indicator 200 is color coordinated to indicate a unit of size measurement including metric and fractional inch. Fractional inch measurement may be blue, red, green, yellow, white, black or otherwise. Likewise other rings 206 or background 204 of the size indicator 200 may be color coordinated to indicate a drive unit size 104.

It is an object of the present invention to provide a size indicator 200 having high contrast, large, bold print making socket sizes easy to read. Printed not once, but multiple times around the circumference of the socket and size indicator 200, so users do not have to rotate the socket to find the size.

The size indicator comprises easily identifiable metric (blue) vs. SAE/fractions (red). Bright colors also make socket markers making the size indicators 200 easy to find when dropped. The size indicators 200 are heat/cold resistant, helping protect fingers from burns or cold. The sleeve insulates fingers against heat.

Color-coded bands 120 easily identify which end is the drive (ratchet) end and the drive size without having to look at the end itself. This band 120 also provides a reference as to which way is up when reading the size measurements.

Relief lettering on the size indicator 200 glows when a UV/black light is applied, making the socket markers, and therefore enclosed sockets, easier to find when dropped into dark spaces such as engine compartments or under workbenches and toolboxes.

The size indicators protect sockets from scratches and reduces rattle in toolboxes.

Figure 3:
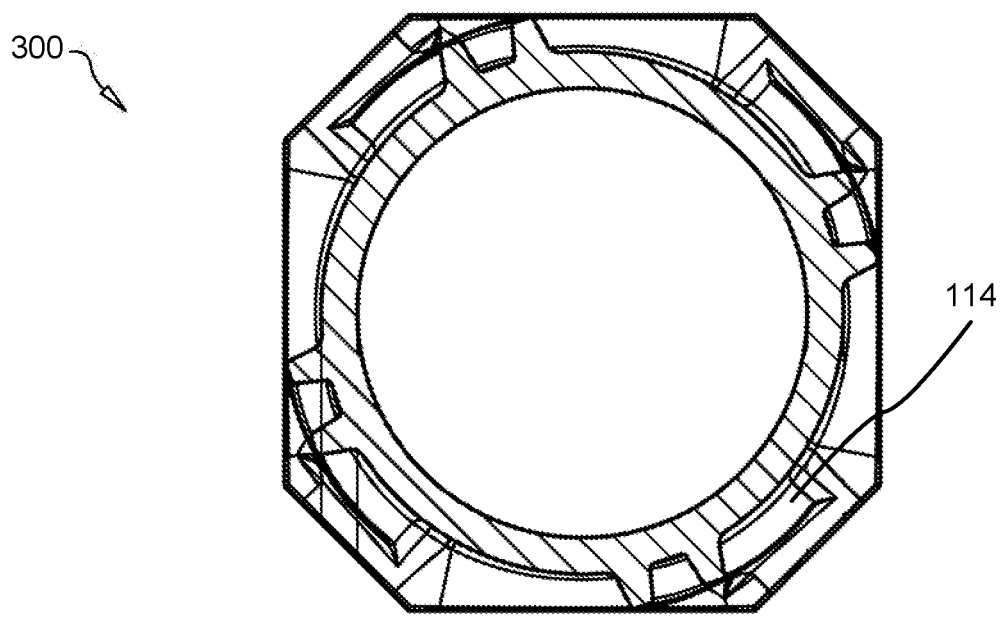
FIG. 3 is a sectioned top perspective view of a socket sleeve and size indicator in accordance with the present invention.

FIG. 3 is a sectioned top perspective view of a socket sleeve and size indicator 300 in accordance with the present invention.

The size indicator 300 from a top perspective may be square, triangular, octagonal or hexagonal in shape as shown. The section breaks 114 are indicated and in relief.

Figure 4:
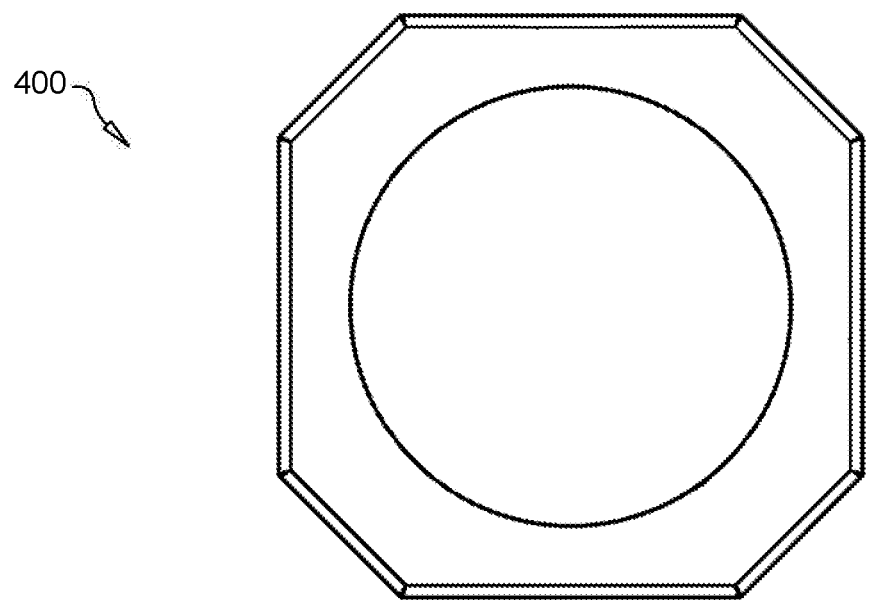
FIG. 4 is a top perspective view of a socket sleeve and size indicator in accordance with the present invention.

FIG. 4 is a top perspective view of a socket sleeve and size indicator 400 in accordance with the present invention.

As shown.

Figure 5:
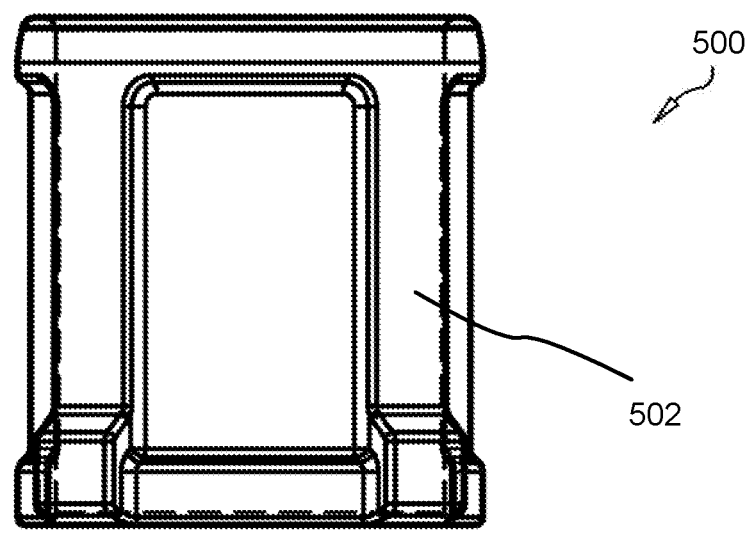
FIG. 5 is a side perspective view of a socket sleeve and size indicator in accordance with the present invention.

FIG. 5 is a side perspective view of a socket sleeve and size indicator 500 in accordance with the present invention.

Rather than having planar surfaces which prevent rolling of the size indicator 500, the size indicator 500 may rest on any two section breaks 502. The section breaks 502 protrude outwardly from the main body of the size indicator 500.

Figure 6:
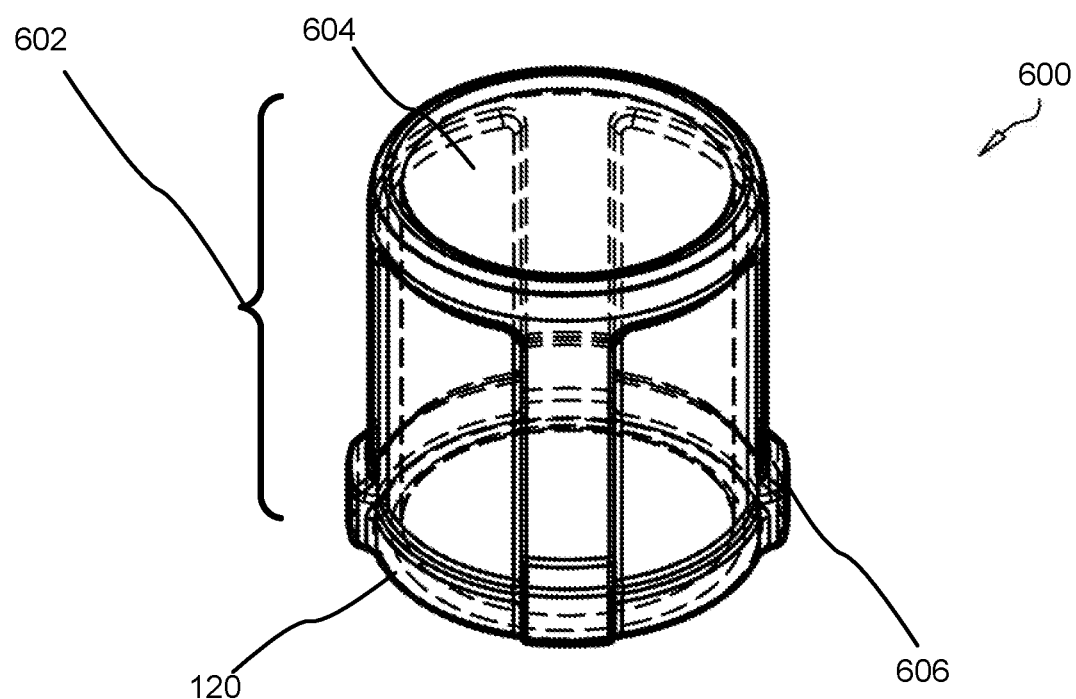
FIG. 6 is a sectioned top, side perspective view of a socket sleeve and size indicator in accordance with the present invention.

FIG. 6 is a sectioned top, side perspective view of a socket sleeve and size indicator 600 in accordance with the present invention.

The main body 602 of the size indicator 600 is shown.

The lower band 120 may comprise a plurality of cantilevered flanges or outwardly-protruding lips 606.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A detachable, anti-roll, socket wrench size indicator comprising:
    a silicone sleeve defining a hollow cylindrical inner recess for receiving and partially enveloping a socket wrench, the silicone sleeve having a faceted outer surface;
    wherein two or more faceted surfaces bear relief text indicating a socket wrench size in one of inches and millimeters and in a color matching a color of a band circumscribing a lower edge of the silicone sleeve;
    wherein two or more surfaces bear relief text indicating a ratchet square driver size;
    a plurality of sections separated by section breaks, the sections adapted to engage a user's fingers;
    the band circumscribing the lower edge of the silicone sleeve and circumscribing a ratchet end of the socket wrench, the band color-coordinated with the relief text, the band comprising a plurality of cantilevered flanges;
    wherein the socket wrench size indicator is octagonal from a top perspective view.

2. The socket wrench size indicator of claim 1, further comprising four or more planar outer faces such that the socket wrench size indicator comes to rest on a face without rolling on a substantially planar surface.

3. The socket wrench size indicator of claim 1, further comprising a plurality of socket wrench size indicators, with socket wrench size indicators indicating a metric size color coordinated to distinguish from socket wrench size indicators indicating a fractional inch.

4. The socket wrench size indicator of claim 1, further comprising one or more blacklight-reflective paints.

5. The socket wrench size indicator of claim 1, further comprising one or more chemiluminescent paints.

6. A detachable, anti-roll, socket wrench size indicator comprising:
    a silicone sleeve defining a hollow cylindrical inner recess for receiving and partially enveloping a socket wrench, the silicone sleeve having a multi-faced outer surface;
    wherein two or more faceted surfaces are imprinted with text indicating a socket wrench size in one of inches and millimeters and in a color matching a color of a band circumscribing a lower edge of the silicone sleeve;
    wherein two or more surfaces are imprinted with text indicating a ratchet square driver size;
    the band circumscribing the lower edge of the silicone sleeve and a ratchet end of the socket wrench, the band color-coordinated with the relief text, the band comprising a plurality of cantilevered flanges;
    wherein the socket wrench size indicator is octagonal from a top perspective view.

7. The socket wrench size indicator of claim 6, comprising four planar outer faces indicating a socket wrench size including to the two or more faceted surfaces.

8. The socket wrench size indicator of claim 6, further comprising one or more surfaces indicating a trademark.

9. The socket wrench size indicator of claim 6, further comprising one or more blacklight-reflective paints.

10. The socket wrench size indicator of claim 6, further comprising one or more chemiluminescent paints.

11. The socket wrench size indicator of claim 6, further comprising a plurality of sections separated by section breaks adapted to engage a user's fingers.

\* \* \* \* \*